INVENTOR
Werner Mittag
BY Michael S. Striker
ATTORNEY

INVENTOR
Werner Mittag
BY Michael S. Striker
ATTORNEY

United States Patent Office 2,994,104
Patented Aug. 1, 1961

2,994,104
PROCESS OF AND APPARATUS FOR THE MANUFACTURE OF FLEXIBLE TUBING CONSISTING OF PLASTIC STRIPS WOUND INTO INTERMESHING CONVOLUTIONS
Werner Mittag, 52 Patschkauer Weg,
Berlin-Dahlem, Germany
Filed Apr. 16, 1958, Ser. No. 728,832
Claims priority, application Germany Apr. 18, 1957
19 Claims. (Cl. 18—12)

The present invention relates to a process of and apparatus for the manufacture of tubing for use as a flexible protecting sheath for cables or the like, which is formed by continuously winding a profiled plastic band into a plurality of adjacent, intermeshing, helical, and relatively movable convolutions.

An important object of the invention is to provide a process of and apparatus for forming such tubing from a plastic strip just extruded through a discharge nozzle without reheating of the extruded product before or during the winding operation.

Many attempts were made to form flexible tubing, for example, protective hose for cables known as B-X cables and the like, by winding extruded plastic material of suitable profile in the same manner as known from the manufacture of such products from profiled metal sheet strips. However, the machines suitable for use in connection with sheet metal have proven unsatisfactory for manufacture of tubing made of profiled plastic bands. In fact, no plastic tubing of this general character is known at the present time.

The instant invention provides a process of and apparatus for the manufacture of such articles in a relatively simple and economical way. According to the novel process, a tube is formed by winding a profiled plastic strip, freshly extruded through the discharge nozzle of a press or the like and while still in deformable state, in such a way that the strip is subjected to spreading action during winding into a number of intermeshing convolutions, and each so formed convolution of the tubing is subjected to tensioning or spreading forces up to the point where the final product is cooled to harden the plastic material and to thus maintain the final and desired shape and flexibility of the plastic tube.

The final product has the appearance of an externally threaded flexible cylindrical element and may be described as being formed with a helical recess and a helical corrugation of preferably rectangular contour. During the manufacture of my novel plastic product, the spreading forces act upon the ribs of the continuously moving and rotating newly formed tube which latter is first led in a straight and immediately thereupon in an inclined path. The spreading effect upon the newly formed tubing before and during cooling thereof may be assisted by gravity in that the product is led in such a way as to enable at least one component of the gravitational force to aid the spreading action. By spreading is meant the step of so extending the newly formed tubing with convolutions formed by a suitably profiled just extruded plastic strip which is still sufficiently warm to permit shaping, that the engagement of adjacent ribs forming the profile of the extruded strip is such as to prevent deformation thereof during and after the winding operation up to the time when the finished product is sufficiently cooled and hardened to prevent any deformation of its convolutions.

It is important for proper performance and continuous operation of the novel apparatus, as well as for the proper shaping of a just extruded plastic strip, that the velocity with which the strip is extruded through the discharge nozzle of a plastic press be identical with that of winding or coiling the still hot and thus deformable strip into the convolutions of which the novel plastic tubing is made. To that end, the speed at which the extruded product is coiled must be sufficiently adjustable to prevent eventual breaking of the strip between the extruding and coiling stations.

The still hot strip of preferably S-shaped meandering cross sectional contour is somewhat deformed during its travel between the extruding and coiling stations, and the purpose of spreading is to return each portion of the deformed strip into its original shape no later than at the time when the product is subjected to cooling. In other words, the profile of a freshly extruded strip must be returned into and maintained in such form as to simulate a thread and to permit accurate and continuous intermeshing of certain ribs of each helical convolution in such a way that that final product is of uniform appearance, flexibility and stretchability. After sufficient spreading, the adjacent walls of each convolution are practically at true right angles with respect to each other which is achieved by so stretching or spreading or fulling the meshing convolutions that the tubing is extended to its greatest possible length without, however, deforming the interengaging walls in opposing directions. As it is desired that the final product, i.e. a tubing or hose whose peripheral zone has the configuration of a screw thread, be flexible in all directions, the adjacent interengaging convolutions must be movable with respect to each other to precisely the same extent in all parts of the tubing. This is attained by fulling the tube in such a way that the latter is continuously rotated while being led in an arcuate and thereupon preferably in an inclined path. As a result thereof, the final product, after cooling and concurrent hardening, maintains its flexibility to the same extent as the still deformable product between the winding and cooling stations. To insure that the once "rectified" convolutions of tubing between the winding and cooling stations maintain their profile without undesirable deformation, the tubing is preferably led from the winding station in a somewhat inclined path, thus enabling the force of gravity to assist the spreading of threads to the greatest possible extent by the natural tendency of downwardly traveling continuously rotating tubing to expand as much as possible. Specifically constructed spreading means may be provided to assist or to replace the force of gravity, or at least one of its components, by maintaining the convolutions of tubing at a desired distance from one another at one or more points between the winding and cooling stations. If no such means are provided, the inclination of path in which the tubing is led between said stations may begin immediately or very shortly after the tubing leaves the coiling station.

Universal flexibility of the final product may be increased by sudden cooling of the suitably spaced convolutions of the uniformly stretched tube which entails a certain shrinkage concurrently with the hardening of plastic material. A further advantage of such treatment is in that the surface of the finished product receives an extraordinarily smooth appearance which is very desirable in the products of this character.

The cross-sectional contour of plastic strip of which the novel tubing is made can be said to approximate that of a generally U-shaped member having the free end of one of its legs connected with a member of inverted L-shape. It can also be described as being meandered or corrugated, i.e. having a ridge and a furrow at each of its sides. During coiling, one rib of a convolution enters into the furrow of an adjacent convolutoin and the flexibility of the tubing is due to the freedom of such rib to move in the furrow of the adjacent convolution to an extent controlled by its thickness and by the width of the furrow, respectively. The relative movements of adjacent convolutions may best be described by assuming that one flange of a U-shaped annular member is inserted between the flanges of an annular member of inverted U-shape whereby one of said members may be inclined or axially displaced with respect to the other to an extent determined by the distance between and the thickness of their respective legs.

The novel apparatus comprises essentially extruding means; winding or coiling means; guide means for the extruded strip before, at and beyond the coiling station all the way until the product is hardened; and fulling or spreading means for restoring the slightly deformed strip and convolutions formed therefrom back into desired shape.

The extrusion assembly may be any one of the known types, for example, an extrusion press or the like and, in addition to means for maintaining the temperature of plastic material therein at a desired level, comprises an extrusion nozzle for delivering a continuous plastic strip of such configuration that the strip may be wound into a number of intermeshing or interengaging convolutions at the coiling station.

The coiling or winding apparatus consists basically of a stationary outer coiling member and a driven inner coiling member, the latter entraining the plastic strip which enters the outer coiling member and causing the strip to rotate therewith and therealong. The outer coiling member is provided with suitable means for introducing the plastic strip, for example a channeled rail, which leads the just extruded, still hot, and thus deformable plastic strip into the outer coiling member in such position that a channel or furrow in said strip is located externally when the strip is wound into a number of helical intermeshing convolutions within the outer and about the inner coiling member, respectively.

Guide means carried by and/or adjacent to the outer coiling member comprise an elongated, preferably cylindrical wire-like element extending into the aforesaid channeled rail and entering the channel or furrow in the plastic strip entrained by said inner coiling member, and leads same through a suitable aperture into the outer coiling member. Adjacent to the cylindrical guide element is a next guide device consisting of a roller also entering the furrow in the advancing plastic strip; a nearly semi-circular guide member which causes curving of the strip in the outer coiling member; a second guide roller entering the furrow when the plastic strip has so advanced as to form about three fourths of a convolution; and additional guide devices which enter the channel between successive pairs of already intermeshing convolutions.

The inner coiling member is so shaped, for example by knurling or ribbing a selected portion of its peripheral zone, as to engage and entrain the plastic strip which latter is thereupon displaced in the axial direction of said member by the above-described guide elements. The inner coiling member is connected with a conveying means for the plastic tubing, preferably by means of a universal joint, the conveying means beyond said joint being preferably somewhat inclined in order to influence the flexibility and contour of the intermeshing plastic convolutions.

The guide means in the general area of the coiling station, in addition to compelling the plastic strip caused by the inner coiling member to travel in a helical path and to thus form a number of intermeshing convolutions, cause re-shaping or spreading of ribs of the plastic strip which latter, being still in plasticized state, is slightly deformed during its travel to the coiling station. The cylindrical guide element and the last aforementioned guide roller are preferably mounted in a swingable insert pivotally connected with and received in a suitable cutout in the outer coiling member. The substantially semi-circular guide element is fixed, e.g. soldered, to the inner wall of the tubular outer coiling member and is so inclined as to determine the pitch of each convolution of the plastic tubing. A portion of the outer coiling member adjacent to the area where the convolutions are formed therein is preferably outwardly flared so as to avoid any frictional engagements with the plastic tubing as the latter advances about and along the continuously rotating inner coiling member.

It is further preferred to provide a substantially sectoral cutout in the outer coiling member which permits entry of the first aforementioned guide roller adjacent to the cylindrical guide element, said guide roller being preferably mounted for adjustments to allow its use with inner coiling members of different diameters, if desired. Moreover, such sectoral cutout in the outer coiling member may accommodate additional guide and spreading means acting in the external channels between intermeshing convolutions. The additional guide means may consist of suitably shaped wires supported in spaced bores provided in the wall of the outer coiling member.

Still further spreading and guide means may be provided for action upon the tubing at a distance beyond the coiling station. Such spreading means may consist of one or more rollers adjustably mounted on an elongated supporting element carried by the outer coiling member and extending in substantially parallelism with the advancing tubing.

As before stated, the inner coiling member is preferably connected with an inclined conveying or guide bar, the connection therebetween consisting of a universal joint of the Cardan type or the like, whereby the tubing advancing therealong is continuously rotated by the rotatably connected assembly of the conveying bar and inner coiling member. The inclined conveying or guide bar allows the force of gravity to act upon the advancing tubing in a manner tending to increase the distacne between its convolutions. The active component of gravitational force increases proportionally with increased inclination of the conveying bar. The free end of the latter is supported in a suitable bearing of adjustable inclination. Said conveying or guide bar preferably consists of a series of telescopically joined sections of gradually diminishing diameters which allows for longitudinal adjustments thereof and for frictionless advancement of the tubular product therealong.

It is often advisable to subject the advancing still plasticized tubing to a sudden cooling action. In such instances, a cooling device operating for example with air or water passing through a plurality of jets therein, may be disposed in surrounding relationship with respect to the inclined conveying bar. The advancing tubing passes about said bar and through the cooling apparatus to be immediately subjected to hardening and slight shrinkage whereupon the configuration and flexibility of the product remain unchanged. The cooling device may be omitted and the plastic tubing allowed to cool and harden during its travel along the conveying bar.

A further feature of the invention resides in the provision of automatic means for conforming the winding speed of the inner coiling member to the speed at which the plastic strip is extruded through the nozzle. Such automatic means include one or more scanning elements over which the extruded strip passes between the nozzle and the coiling station, and an operative connection between the scanning means and the motor which drives the inner coiling member. The scanning means may include one or more photoelectric cells and the operative connection between the cells and said motor may then consist of a regulator electrically connected with the photoelectric cells and also with the motor in such a way that the angular velocity of the inner coiling member is immediately adjustable within a very wide range. The motor may be of the infinitely variable speed type or it may be coupled with an infinitely variable speed transmission controlling the angular velocity of the inner coiling member or core bar over a suitable coupling means or the like. The scanning means and the above described adjustable drive for the inner coiling member prevent eventual breakage or excessive slack of the extruded strip during its travel to the coiling station. Such breakage must be taken into consideration since, as before stated, the extruded strip is still in hot and therefore deformable state and should remain in such condition during winding at the coiling station.

In order to further reduce the danger of breakage of extruded plastic strip right after extrusion, the strip may be led along an inclined slide which latter, in addition, serves as a heat conductor to reduce the temperature of the extruded product to a desired extent before reaching the coiling station. By suitable selection of the temperature of plastic material in the press; by selection of extrusion speeds; of the distance between the press and the coiling station; and of the heat conductivity of the slide, the plastic strip reaches the coiling station in a condition best suited for subsequent winding into intermeshing convolutions and rectifying or fulling of their cross sectional contours.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Figures 1, 3:
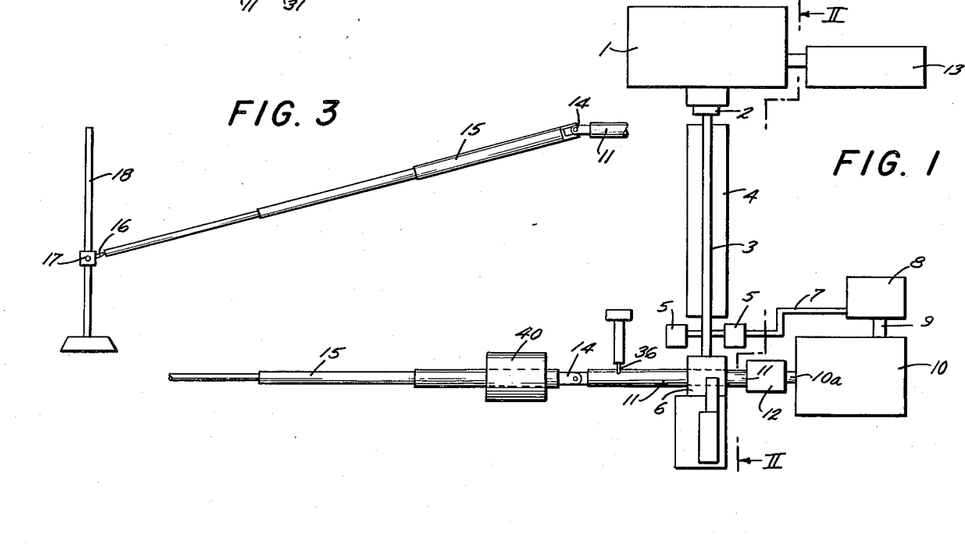
FIG. 1 is a diagrammatic top plan view of the apparatus with the end portion of guide means for the finished tubing broken away.
FIG. 3 illustrates a portion of and the support for the guide means upon which the finished tubing is led from the coiling station.
Figure 2:
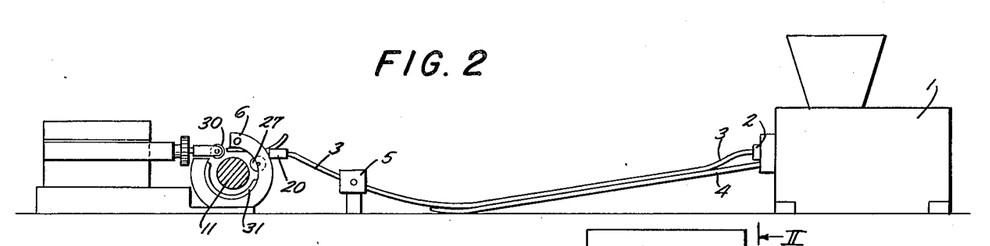
FIG. 2 is a slightly enlarged diagrammatical and partly sectional view of the apparatus in side elevation, as seen from line II—II of FIG. 1.
Figure 7:
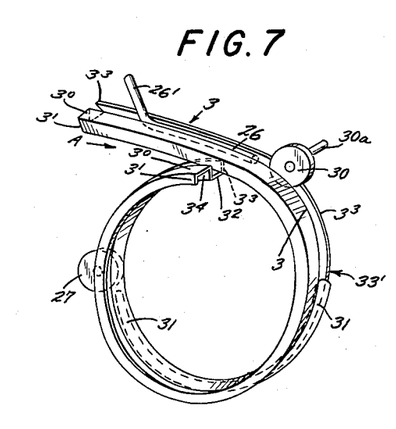
FIG. 7 illustrates in perspective view a complete convolution of the tubing and certain elements of the guiding and spreading means in operative position with respect thereto.
Figure 8:
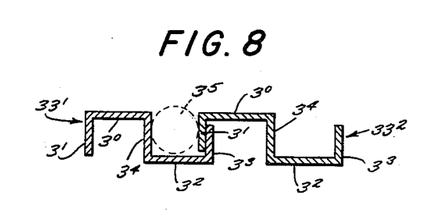
FIG. 8 is a transverse sectional view of two adjacent intermeshing convolutions of the tubing, one element of the spreading means being shown in phantom lines.

Referring now in greater detail to FIGS. 1 to 3, the apparatus therein shown comprises an extruding device 1 of known construction, such as an extrusion press, equipped with a nozzle 2 which extrudes a plastic strip 3 of a cross-sectional contour best shown in FIGS. 7 and 8. The extruded strip or band 3 travels along an inclined slide 4; its slack and consequently the tensile stresses acting thereupon are determined by scanning means 5, which latter may include one or more photoelectric cells or the like. In this manner, the velocity with which the nozzle 2 extrudes strips 3 is synchronized with the speed at which the extruded strip is wound into a tubing at the coiling station. The latter comprises an outer coiling member 6 which will be described in greater detail as this description proceeds.

The scanning means 5, preferably embodying one or more photoelectric cells, are connected by means of conduits 7 with an automatic control apparatus 8 of known construction. Core bar 11 which passes through the opening in outer coiling member 6 is connected to the shaft 10a extending from the drive motor housing 10 by means of a coupling 12, for example, a toothless electromagnetic coupling or an equivalent thereof. Housing 10, in addition to the motor, further contains an infinitely variable speed transmission, or the motor may be of the variable speed type so as to rotate the core bar 11 at any desired speed signaled by the shaft 9 which connects it with the control apparatus 8. In this manner, scanning means 5, through the conduits 7, control apparatus 8, shaft 9, motor means in housing 10, shaft 10a, and coupling 12, control the angular velocity of core bar 11 to conform it to the rate at which the strip 3 is extruded from press 1.

Reference numeral 13 indicates schematically a switch case which controls the temperature of plastic material in press 1 and consequently the temperature of extruded plastic strip 3. By maintaining the temperature of plastic material in press 1 at a certain level, one can control the deformability of extruded strip 3 when it reaches the coiling station. As above mentioned, the strip should retain a certain amount of plasticity during coiling into a number of intermeshing convolutions which in their entirety form the novel plastic tubing.

The inner coiling means in the form of a core bar 11 and the outer coiling member 6, with certain guiding and spreading elements attached thereto, constitute the coiling or winding assembly which, with the bar 11 floating somewhat off center in the member 6, transforms the plasticized strip 3 into a number of adjacent and inter-engaging convolutions, the latter in their entirety forming the final, universally flexible, tubular plastic product. Core bar 11 is connected with a guide bar 15 by means of a universal joint 14. Member 15 is somewhat inclined to the horizontal and may consist of a series of sections of different diameters, as shown in FIGS. 1 and 3. Its free end, distant from joint 14, may be supported by an upright member 18 which carries a vertically adjustable clamping device 17. The latter is combined with a bearing member 16 of adjustable inclination which engages the end of guide bar 15. In FIG. 3, the inclination of bar 15 to horizontal is approximately 25 degrees. It will be appreciated that the provision of a pointed bearing member 16 is but one of many possible solutions for rotatably supporting the free end of inclined bar 15; for example, an automatically adjustable ball bearing or the like may be used with equal results. The length of guide bar 15 may be selected at will; this bar may consist of a number of telescoped sections to permit longitudinal adjustments within a desired range.

Figure 4:
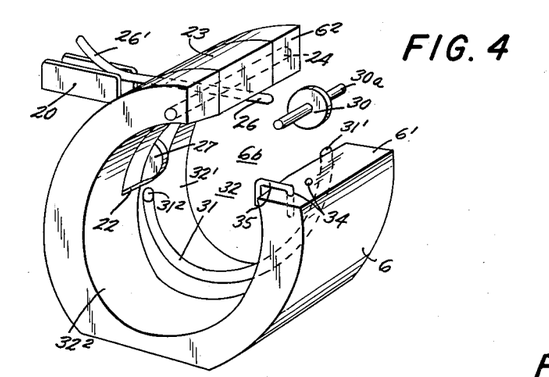
FIG. 4 is a greatly enlarged perspective view of the outer coiling or winding means.
Figure 5:
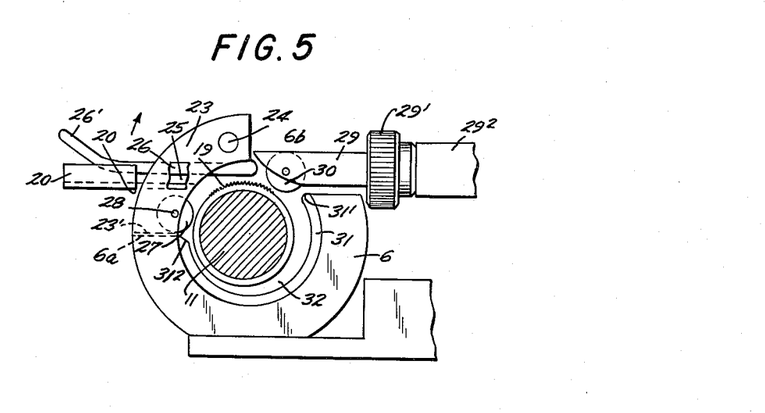
FIG. 5 illustrates the coiling station in side elevation with certain elements, partly broken away.
Figure 6:
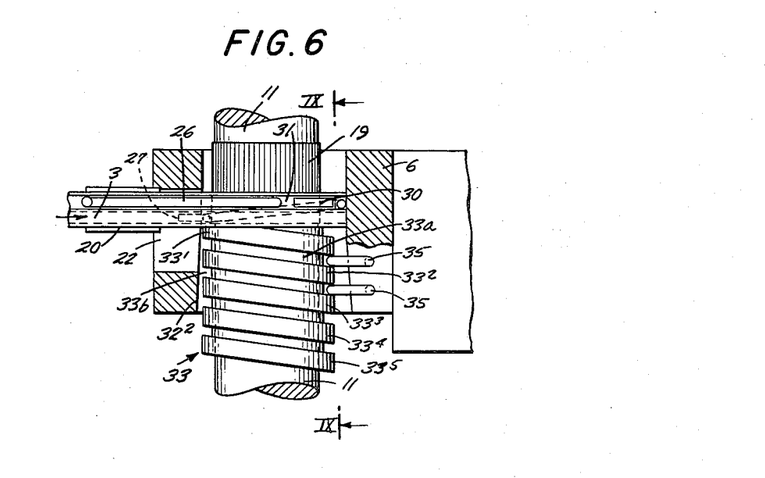
FIG. 6 is a top plan view of the coiling station with the outer coiling means shown in horizontal section, further illustrating a portion of finished tubing and of the inner coiling means.

Referring now to FIGS. 4 to 6, a portion of the peripheral zone of core bar 11 in the outer coiling member 6 is ribbed, as at 19 (see FIGS. 5 and 6), the ribs being axially parallel and forming an annulus of predetermined length, since it is desired that the tube 33 be free to move in the axial direction of member 11. The ribbed or knurled portion 19 extends into that zone of outer coiling member 6 where the convolutions are formed, i.e. the portion 19 is aligned with a channeled rail 20 which is fixed to the outer coiling member 6. As best shown in FIG. 2, rail 20 is aligned with slide 4 and thus supports and guides a strip 3, after the latter has passed over scanning means 5, into the coiling station. In order to permit proper positioning of ribbed portion 19, core bar 11 and/or the outer coiling member 6 are axially displaceable with respect to each other. It is advisable to mount the outer member 6 for axial displacements while the core bar 11 remains stationary. The conical end of the latter may be held in suitably shaped portion 21 of clutch assembly 12 (see FIGS. 9 and 10). Annular portion 19 of core bar 11 entrains the plastic strip 3 coming from press 1 and causes the convolutions formed in the outer coiling member 6 to rotate with and to advance along the inner coiling member 11.

The cross-sectional contour of strip 3 is of well known meandering configuration, as is shown in FIG. 7. The free end of rib $3^1$ extends inwardly in a plane approximately at right angles to the axis of final tubular product 33. Adjacent to rib $3^1$ is a second rib or wall $3^0$ whose outer surface is the outer face of convolution $33^1$. Adjacent to rib $3^0$ is a wall or rib $3^4$ which is parallel with rib $3^1$ as well as with a rib $3^3$ spaced therefrom by a rib $3^2$, the latter being parallel with rib $3^0$.

FIG. 8 illustrates in transverse section a pair of intermeshing convolutions $33^1$ and $33^2$, each consisting of ribs $3^1$, $3^0$, $3^4$, $3^2$ and $3^3$ in that order, the adjacent walls being disposed at right angles to each other. The convolutions $33^1$ and $33^2$ are held in mesh by so coiling same that the wall $3^1$ of convolution $33^2$ extends into the recess formed between ribs $3^4$, $3^2$ and $3^3$ of convolution $33^1$; or, one could say that the rib $3^3$ of convolution $33^1$ extends into the recess or furrow between the ribs, $3^1$, $3^0$ and $3^4$ of convolution $33^2$.

Nozzle 2 extrudes a strip 3 whose ribs $3^1$, $3^0$, $3^4$, $3^2$ and $3^3$ are at right angles to each other. During the travel of strip 3 along slide 4, over scanning means 5 and rail 20, its ribs collapse under their own weight and owing to contact with means 4, 5 and 20, i.e. the cross-sectional shape of still very plastic strip 3 is deformed to a certain extent. This has been illustrated in FIG. 7 where the portion of strip 3 adjacent to arrow A shows deformed ribs $3^1$, $3^0$ and $3^3$. Such deformation of the plastic article is the main reason that the known winding or coiling machines for metallic strips are not suited for use with plastic bands without requiring an immediate cooling of the extruded article and renewed heating into deformable state at the coiling station.

The deformed strip 3 must be "rectified" or re-shaped during and after the coiling operation in order to insure sufficient flexibility in all directions of the subsequently cooled plastic tubing 33. Such rectifying of the strip at and beyond the coiling station occurs as follows:

Outer coiling member 6 has a cutout 22 receiving an insert 23 which latter is mounted on a pin or axle 24 parallel with the axis of member 6 (see FIG. 4). Swinging movements of insert 23 are limited by the edge $20^1$ of rail 20 on the one hand, and by the surface $6a$ of the outer coiling member 6 against which the adjacent surface $23^1$ of member 23 abuts in its position shown in FIG. 5. Insert 23 is swingable in order to accommodate strips 3 of different dimensions. It has a cutout 25 substantially in line with the channeled rail 20; this cutout accommodates a median portion of guide wire 26 which is secured to the upper wall of member 23 therein. Element 26 extends into the channeled rail 20 in spaced relation with respect to the bottom wall of the latter and has an upwardly bent extension $26^1$. The other end of element 26 extends slightly beyond the vertical end face $6^2$ of outer coiling member 6. As can be observed in FIG. 7, the element 26 (shown detached from member 6) extends into the channel or furrow between the ribs $3^4$, $3^2$ and $3^3$ of convolution $33^1$ and guides the strip 3 into the outer coiling member 6.

Insert 23 also supports a roller 27 in a position reached by strip 3 when the latter has completed about three fourths of its circular travel in the outer coiling member 6, i.e. when three fourths of convolution $33^1$ are completed. Roller 27, mounted on a horizontal axle 28, enters the same recess into which, about 270 degrees in advance thereof, the guide element 26 extends. Of course, roller 27 is displaced with respect to element 26 in the axial direction of outer coiling member 6 depending upon the pitch, i.e. inclination of helical convolution $33^1$ with respect to the radial plane of member 6 (see FIG. 12).

Outer coiling member 6 has a substantially sectoral cutout $6b$, disposed between end faces $6^1$ and $6^2$, into which extends an arm 29 axially adjustable with respect to its holding member $29^2$ by means of a knurled nut $29^1$. Arm 29 supports a roller 30 mounted therein by means of a horizontal axle $30a$. Roller 30 extends into the channel between ribs $3^4$, $3^2$ and $3^3$ of strip 3 beyond the straight end of element 26 (see FIG. 7). The guiding of strip 3 between rollers 30 and 27 is completed by an approximately semi-circular wire 31; its respective ends $31^1$ and $31^2$ are adjacent to rollers 30 and 27, respectively (see FIGS. 4, 5 and 7). The diameters of guide members 26, 31, as well as the thicknesses of rollers 27, 30 equal or approach the desired distance between ribs $3^4$ and $3^3$ of convolution $33^1$. Element 31 is soldered or otherwise fixed to the cylindrical inner wall $32^1$ in the cylindrical opening or bore 32 of member 6. It is, of course, slightly inclined to the radial plane of member 6 (see FIG. 12) so as to lead strip 3 according to the necessary pitch of convolution $33^1$ from roller 30 toward roller 27. Immediately adjacent to guide element 31, the inner surface $32^2$ of outer coiling member 6 tapers outwardly in order to allow frictionless passage of consecutively formed convolutions $33^1$, $33^2$, $33^3$, $33^4$, $33^5$, etc. of tubing 33 along core bar 11.

Surface 61 of the outer coiling member 6 is provided with a pair of bores 34 for reception of further guide elements 35 shown in FIGS. 4 and 6, in the form of U-shaped wires. The diameters of elements 35 are somewhat less than those of elements 26 and 31 as they enter the recesses between ribs $3^4$, $3^2$ of one convoltion and the wall $3^1$ of the next convolution meshing with the former one. The position of one of members 35 is illustrated in FIG. 8 in phantom lines, its purpose being to spread or rectify the ribs of each convolution back into their original form, i.e. that given to strip 3 by the extrusion die 2.

Figures 9, 10, 11, 12:
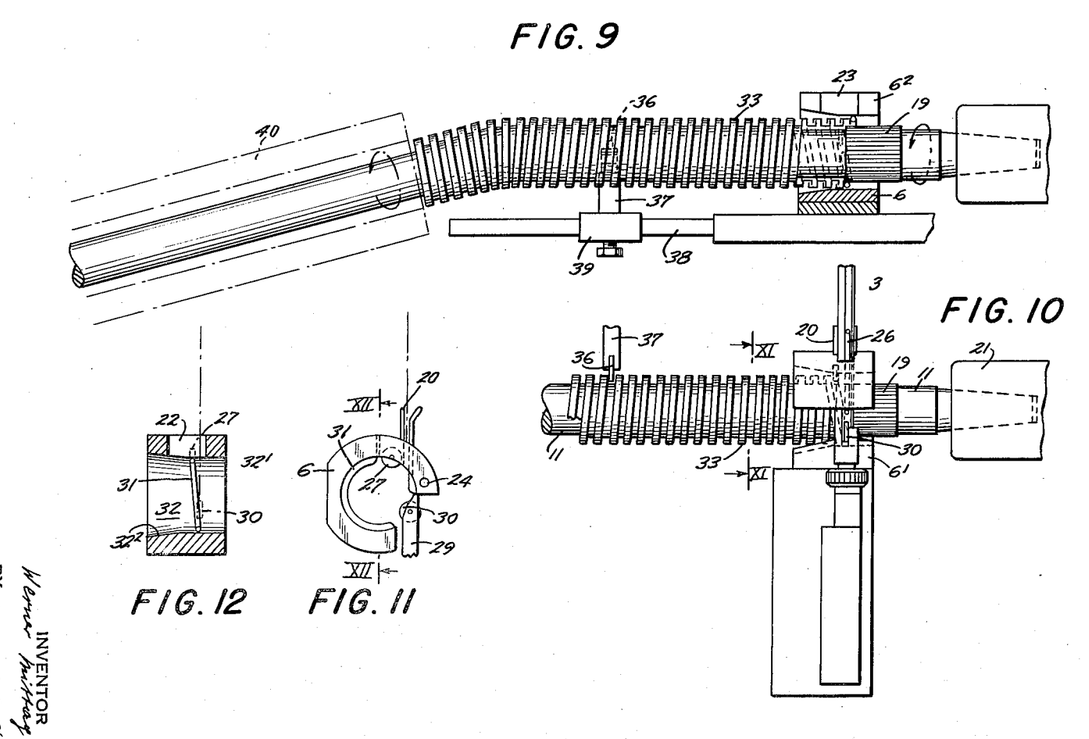
FIG. 9 is a somewhat reduced partly sectional view of the coiling station as seen from line IX—IX in FIG. 6, further illustrating additional spreading means for the finished tubing and indicating the cooling means in dot-dash lines.
FIG. 10 is a top plan view of a portion of structure shown in FIG. 9.
FIG. 11 is an end view of the outer coiling means as seen from line XI—XI in FIG. 10.
FIG. 12 is a section taken on line XII—XII of FIG. 11.

As shown in FIGS. 1, 9 and 10, a further adjustably mounted spreading or fulling roller 36 may be provided at some distance from the outer coiling member 6. This roller is rotatably held in an arm 37 which, in turn, is carried by a clamping member 39 movable along, and adapted to be locked in a selected position with respect to, guide bar 38 which latter is shown connected to outer coiling member 6.

A cooling device 40 (see FIGS. 1 and 9) may be provided in surrounding relationship with respect to guide bar 15. It preferably comprises a plurality of jets (not shown), providing passage for a cooling medium (e.g. air or water). Tubing 33 rotates and travels in the longitudinal direction of bar 15 within the cooling device 40.

As before stated, the temperature of plastic material in apparatus 1 is sufficiently high so that the strip reaches the outer coiling member 6 in deformable state. In fact, it is slightly deformed when it reaches the rail 20 and must thereupon be rectified, i.e. brought back into desired shape, to a lesser extent by element 26, and to a greater extent by roller 30 whose end surfaces should be rather snugly received in the channel between ribs $3^3$, $3^4$ of the strip 3 while its peripheral surface rotates in contact with the rib $3^2$. Rib $3^1$ is subjected to lesser deformation, since it is led in such a way that its free end depends by gravity and, being slightly above the level of rib $3^2$, comes into sliding contact with slide 4, scanning means 5 and rail 20 to a lesser extent than some other ribs of the strip 3. During the forming of convolutions $33^1$, $33^2$, etc., rib $3^3$ of convolution $33^1$ enters into the channel between walls $3^4$, $3^1$ of adjacent complete convolution $33^2$.

After the strip passes beyond roller 30, its first convolution $33^1$ is further deformed by elements 31 and 27. Guide element 35 (see FIG. 6) closest to roller 30 extends into the channel $33a$ behind the first complete convolution $33^1$ and thus urges rib $3^1$ of convolution $33^2$ against the rib $3^3$ of convolution $33^1$ (see FIG. 8). As above stated, rib $3^1$ is subjected to lesser deformation during travel of strip 3 toward the coiling station; therefore, the action of first member 35 is more felt as far as the rib $3^3$ of convolution $33^1$ is concerned. The second guide element 35, operating in the channel $33b$ between the convolutions $33^2$ and $33^3$, serves the same purpose. In order to correct any deformations which might still remain or occur beyond guide elements 35, adjustably mounted roller 36 subjects the threads of tubing 33 to a final fulling or spreading action. By so spreading the convolutions of tubing 33, the latter becomes flexible in all directions and remains in such condition after hardening of its material during tarvel along bar 15. Beyond roller 36, the threads pass further along core bar 11 and over the universal joint 14, which results in flexing of the tubing 33, the extent of such flexing depending upon the inclination of guide bar 15. It is preferred to so select the inclination of the latter that the tubing is subjected to maximum flexing action, that is, it is bent to the extent permissible by the design of cross sectional contour of its convolutions. The cross-sectional contour and thus the greatest possible flexibility of the tubing is selected in dependency on the intended use to which the tubing is to be put. Of course, the tubing traveling about and along bar 11, joint 14 and guide bar 15 is continuously rotated since the member 11 is uninterruptedly driven by the motor in housing 10 by means of the shaft $10a$ and coupling assembly 12.

As the tubing 33 slides along and rotates with inclined guide bar 15, it exerts an additional stretching or expanding force upon the threads which results in further correction of the ribs of which the convolutions or threads are made. Due to such pull of a lengthy and thus rather heavy portion of tubing 33, the spreading roller 36 may be omitted in which case the spreading action of the tubing advancing downwardly about inclined guide bar 15 is felt all the way up to the coiling station. The tubing may become sufficiently cooled and hardened during its travel along bar 15 without any special cooling means. Suitable lengths of finished product are cut off and removed from the bar 15 to be thereupon utilized for a number of purposes, preferably as a protecting sheath for flexible cables, e.g. B-X cables and the like. As above mentioned, the preferably telescopically assembled sections of guide bar 15 may be extended to any desired length and it is also preferred to progressively reduce the diameter of each telescopically connected section. In fact, it is desirable to gradually reduce the diameter of core bar 11 starting right at the ribbed portion 19 and all the way down to universal joint 14. Such construction further reduces the likelihood of friction between bars 11, 15 and the downwardly progressing tubing 33.

If a cooling apparatus is considered necessary, it is provided in close proximity of the universal joint 14 (see FIG. 9) which latter, as above stated, causes a thorough fulling or flexing of each portion of the passing tubing 33. In this manner, the flexibility of tubing 33 remains unchanged after the latter passes through the cooling station 40. By rapidly cooling the still somewhat deformable product, the surfaces of its convolutions obtain a very smooth finish which, aided by the slight shrinkage during cooling, still further improves the flexibility of tubing 33.

It will be understood that certain of the elements described above, or two or more together, may also find a useful application in other types of coiling apparatus differing from the type described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The process of making plastic tubing by winding a strip of meandering cross sectional contour and consisting of hardenable plastic material into intermeshing helical convolutions which comprises extruding the strip at elevated temperatures; winding the strip into intermeshing convolutions while the material of the strip is still in plasticized state; subjecting the convolutions to a spreading force during winding; and subjecting the tubing to a tensioning force while allowing the material to harden by cooling the same.

2. The process of making plastic tubing by winding a strip of meandering cross sectional contour and consisting of hardenable plastic material into intermeshing helical convolutions which comprises extruding the strip at elevated temperatures; winding the strip into intermeshing convolutions while the material of the strip is still in deformable state; subjecting the convolutions to a spreading action during winding; subjecting the tubing to tensioning forces while the tubing advances in a straight and thereupon in an inclined path; and continuously rotating the advancing tubing.

3. The process of making plastic tubing by winding a strip of meandering cross sectional contour and consisting of hardenable plastic material into intermeshing convolutions which comprises extruding the strip at elevated temperatures; winding the strip into intermeshing convolutions while the material of the strip is still in deformable state; rotating, spreading and advancing the convolutions in a straight and thereupon in an inclined path; and subjecting the rotating convolutions to the force of gravity in such a way that the tubing is expanded while the convolutions are advanced.

4. The process of making plastic tubing by winding a strip of meandering cross sectional contour and consisting of hardenable plastic material into intermeshing convolutions which comprises extruding the strip at elevated temperatures; winding the strip into intermeshing convolutions while the material of the strip is still in deformable state; varying the speed at which the strip is wound in such a way that said speed conforms to the speed at which the strip is extruded; spreading the convolutions during winding; and tensioning the tubing by subjecting same to rotating and gravitational forces.

5. The process of making plastic tubing by winding a strip of meandering cross sectional contour and consisting of hardenable plastic material into intermeshing helical convolutions which comprises extruding the strip at elevated temperatures; winding the strip into intermeshing convolutions while the material of the strip is still in deformable state; spreading the convolutions during winding; tensioning the tubing and simultaneously rotating the same; and subjecting the tubing to rapid cooling while the tubing is tensioned and rotated.

6. The process of making plastic tubing which comprises extruding a strip of hardenable plastic material and of meandering cross sectional contour at elevated temperatures; winding the strip into intermeshing convolutions to form a tubing; subjecting the convolutions to spreading forces during winding; subjecting the tubing to rotating, guiding and tensioning forces while advancing the same in a horizontal and thereupon in an inclined path in such a way that the tensioning forces acting thereupon are components of the force of gravity; and cooling the tubing while under the action of tensioning forces.

7. The process of making flexible plastic tubing which comprises extruding a strip of hardenable plastic material and of meandering cross sectional contour at elevated temperatures; winding the strip into intermeshing convolutions while the material of the strip is still in deformable state; spreading the convolutions during winding; rotating the tubing; allowing the tubing to expand by its own weight; and allowing the tubing to cool while it is so expanded.

8. An apparatus for making flexible tubing of hardenable plastic material which comprises, in combination, means for extruding a plastic strip of meandering cross sectional contour having a ridge and a furrow adjacent thereto at each of its sides; and means for winding the strip into intermeshing convolutions including a stationary tubular outer coiling member; an elongated cylindrical inner coiling member passing through said outer coiling member, means for rotating said inner coiling member, means supported by said outer coiling member for introducing the strip into the outer coiling member, means extending into the furrow at one side of the strip for guiding the same in said outer coiling member and about said inner coiling member in such a way that said strip is wound into intermeshing convolutions of a predetermined pitch, and means operatively connected with said inner coiling member for rotating the convolutions and for advancing the same along and about said inner coiling member.

9. An apparatus for making flexible tubing of hardenable plastic material which comprises, in combination, means for extruding a plastic strip of meandering cross sectional contour having a ridge and a furrow adjacent thereto at each of its sides; means for winding the strip into intermeshing convolutions including a stationary tubular outer coiling member, an elongated cylindrical inner coiling member freely passing through said outer coiling member, means for rotating said inner coiling member, means supported by said outer coiling member for introducing the strip into the outer coiling members, means extending into the furrow at one side of the strip for guiding the same in said outer coiling member and about said inner coiling member in such a way that said strip is wound into intermeshing convolutions of predetermined pitch, and means operatively connected with said inner coiling member for rotating the convolutions and for advancing the same along and about said inner coiling member; elongated conveying means inclined to horizontal for receiving the convolutions from said inner coiling member; and universal joint means for so connecting said conveying means with said inner coiling member that the conveying means rotates when said inner coiling member is rotated.

10. An apparatus for making flexible tubing of hardenable plastic material comprising, in combination, means for extruding a plastic strip of meandering cross sectional contour having a ridge and a furrow at each of its sides; means for winding the strip into intermeshing convolutions including a stationary tubular outer coiling member having an opening and a substantially horizontal axial passage, an elongated cylindrical inner coiling member passing freely through the passage in said outer coiling member in a substantially horizontal plane, said inner coiling member having a peripheral surface, a knurled zone in said peripheral surface substantially aligned with the opening in said outer coiling member, a first end, and a second end, means operatively connected with the first end of said inner coiling member for rotating the same, means for introducing the strip through said opening into the outer coiling member, said last mentioned means comprising a substantially horizontal channeled member fixed to said outer coiling member, first guide means comprising an elongated cylindrical element fixed to said outer coiling member and extending through the opening into said channeled member and into the furrow at that side of the strip which faces away from said inner coiling member when the strip passes through said channeled member, second guide means comprising a roller mounted for rotation about a horizontal axis and extending into said outer coiling member adjacent to said first guide means and into the last mentioned furrow of the strip, third guide means comprising a substantially semicircular member having a first end adjacent to said second guide means, a second end, and being fixed to the outer coiling member in said passage thereof and located in a plane inclined with respect to the planes of said first and said second guide means and extending into the last mentioned furrow of the strip, and fourth guide means adjacent to the second end of said third guide means and including a roller fixed to said outer coiling member for rotation about a substantially horizontal axis; conveyor means comprising an elongated bar downwardly inclined with respect to said inner coiling member, said bar having one end operatively connected with the second end of said inner coiling member and another end; and means for rotatably supporting the last mentioned end of said bar.

11. An apparatus for making flexible tubing of hardenable plastic material comprising, in combination, means for extruding a plastic strip of meandering cross sectional contour having a ridge and a furrow at each of its sides; a stationary outer coiling member having a substantially axial horizontal passage, a sectoral cutout bounded by a substantially horizontal and a substantially vertical surface, and a second cutout adjacent to said vertical surface; an element received in said second cutout for limited swinging movements about a horizontal axis and having an opening therein; a substantially horizontal channeled rail fixed to said outer coiling member in such a way that the strip advancing through said rail passes through the opening in said element; an elongated guide wire fixed to said element and extending through said opening therein into said rail for entering the furrow at the upper side of the strip when the latter advances in said rail; a first guide roller mounted for rotation about a horizontal axis, said roller being disposed in said sectoral cutout and being aligned with said guide wire; a substantially semicircular guide wire fixed to the outer coiling member in said passage thereof; a second guide roller fixed to said element for rotation about a substantially horizontal axis, said first mentioned guide wire, said first roller, said semicircular guide wire and said second roller being so disposed as to define a helical path for a strip advancing from said rail through the opening in said element and into the passage in said outer coiling member; a cylindrical inner coiling member passing freely through the passage of said outer coiling member, said inner coiling member having a knurled peripheral zone substantially in line with the opening in said element, a first end, and a second end; means operatively connected with the first end of said inner coiling member for rotating the same; a downwardly inclined conveying bar having a first end and a second end; a universal joint disposed between the second end of said inner coiling member and the first end of said bar for rotating the bar when said inner coiling member rotates; and stationary means for rotatably supporting the second end of said bar at a level below the level of said first end thereof; said apparatus operating in such a way that a strip extruded in said first mentioned means and led in said rail into said outer coiling member is engaged by the knurled zone of said inner coiling member and is led thereabout so that the furrow at the side of the strip facing away from said inner coiling member is successively entered into by said first mentioned guide wire, said first roller, said semicircular guide wire, and said second roller to form intermeshing convolutions advancing along and about said inner coiling member, over said joint and along and about said bar.

12. An apparatus for making flexible tubing of hardenable plastic material comprising, in combination, extruding means for continuously delivering a plastic strip of meandering cross sectional contour having a ridge and a furrow at each of its sides; a stationary outer coiling member spaced from said extruding means, said outer coiling member having a substantially horizontal passage, a sectoral cutout bounded by a substantially horizontal and a substantially vertical surface, and a second cutout adjacent to said vertical surface; an inner coiling member of cylindrical contour passing freely through the passage in said outer coiling member, said inner coiling member having a knurled peripheral zone aligned with said second cutout, a first end, and a second end; motor means operatively connected with the first end of said inner coiling member for rotating the same; a guide roller extending into the sectoral cutout of said outer coiling member; means for supporting said roller for rotation about a substantially horizontal axis; means for adjusting the position of said roller with respect to said outer coiling member; a channeled rail fixed to said outer coiling member; an insert provided in the second cutout of said outer coiling member, said insert swingable about a horizontal axis and having an opening aligned with said rail; a guide wire fixed to the insert in said opening thereof and extending into said rail; a substantially semicircular guide wire fixed to the outer coiling member in said passage thereof; a second roller fixed to said insert for rotation about a substantially horizontal axis, said first mentioned guide wire, said first mentioned roller, said semicircular wire and said second roller defining a helical path for the plastic strip passing in said rail through the opening in said insert into the axial passage of said outer coiling member and about said inner coiling member whereby the knurled surface of said inner coiling member entrains one side of the strip and said first mentioned guide wire, said first mentioned roller, said semicircular wire and said second roller consecutively enter the furrow at the other side of the strip for guiding the same in a helical path defined thereby, and the so formed intermeshing convolutions advancing toward the second end of said inner coiling member; spaced guide means fixed to the outer coiling member adjacent to the path of the convolutions advancing toward the second end of said inner coiling member and extending therebetween for spacing the convolutions from each other; a universal joint fixed to the second end of said inner coiling member; a downwardly inclined bar having an upper end fixed to said joint and a lower end; and means for rotatably supporting the lower end of said bar.

13. An apparatus for making flexible tubing of hardenable plastic material comprising, in combination, extruding means for delivering a plastic strip of meandering cross sectional contour having a ridge and a furrow at each of its sides; an outer coiling member of tubular shape having a cutout; an inner coiling member of cylindrical contour passing through said outer coiling member; means for rotating said inner coiling member; means for guiding the strip through the cutout and into said outer coiling member; means for guiding the strip in said outer coiling member in a helical path about said inner coiling member; and means operatively connected with said inner coiling member for engaging said strip and for advancing the convolutions formed by said last mentioned means about and along said inner coiling member.

14. The apparatus as set forth in claim 9, wherein said conveying means consists of a plurality of telescoped sections, the diameters of said sections diminishing in a direction away from said joint means.

15. The apparatus as set forth in claim 12, further comprising a third roller in the proximity of the second end of said inner coiling member, said third roller extending into the furrows between the adjacent convolutions advancing along said inner coiling member, and means connected with said outer coiling member for adjustably supporting said third roller.

16. The apparatus as set forth in claim 8, further comprising scanning means disposed in the path of said strip between said extruding means and said outer coiling member, said scanning means operatively connected with the means for rotating the inner coiling member and adapted to control said rotating means so that the rotational speed of said inner coiling member is proportional to the rate at which said extruding means delivers the strip toward said outer coiling member.

17. The apparatus as set forth in claim 9, further comprising means for adjusting the inclination of said conveying means.

18. The apparatus as set forth in claim 16, further comprising a slide for conveying the strip from said extruding means toward said scanning means, said slide downwardly inclined in a direction toward said scanning means.

19. The apparatus as set forth in claim 9, further comprising cooling means for said convolutions, said cooling means surrounding said conveying means.

References Cited in the file of this patent

UNITED STATES PATENTS

| | | |
|---|---|---|
| 1,096,513 | Lombardi | May 12, 1914 |
| 2,695,631 | Seck | Nov. 30, 1954 |
| 2,722,263 | Beare et al. | Nov. 1, 1955 |
| 2,731,040 | Warburton | Jan. 17, 1956 |
| 2,731,070 | Meissner | Jan. 17, 1956 |